3,310,418
FLUORESCENT LAMP COATING

Arnold I. Friedman, South Euclid, and David H. Beaumont, Lyndhurst, Ohio, assignors to General Electric Company, a corporation of New York
No Drawing. Filed Oct. 31, 1963, Ser. No. 320,506
8 Claims. (Cl. 117—33.5)

This invention relates generally to fluorescent lamps, and more particularly to the fluorescent coatings on the envelopes of such lamps, and to methods of applying such coatings. More particularly, the invention relates to an improvement in the adherence of such coatings to the envelope.

Fluorescent coatings have a tendency to chip or flake off the envelope in spots. Various methods of improving the adherence have been proposed in the past with varying degrees of success. To be useful in a fluorescent lamp, an adherence additive must be inert to the lamp environment, it must be a good reflector of, or transparent to, ultraviolet and visible radiations, and it must be in the proper state of dispersion in the particular coating media to assist in adherence.

Some success has been achieved in promoting adherence of phosphors which are applied to the lamp envelope as suspensions in organic systems such as solutions of nitrocellulose in butyl acetate and naphtha. However, such additives as finely divided aluminum oxide and silica, for example, either failed to promote adherence or reduced lamp efficiency when used in aqueous suspensions of phosphor in water soluble binders. It is therefore an object of the invention to provide an adherence additive which meets the above-stated requirements and which is particularly useful in water based coating systems.

We have discovered that improved adherence, without decreased luminous efficiency, is obtained by using finely divided calcium pyrophosphate, $Ca_2P_2O_7$, in aqueous phosphor suspensions. In fact, in view of repeated unsuccessful attempts to find a suitable additive for use in water based coating systems, and our further finding that calcium pyrophosphate does not improve phosphor adherence in organic nitrocellulose suspensions, it appears that calcium pyrophosphate is a unique adherence additive when used in water based phosphor suspensions.

The best results are obtained by using calcium pyrophosphate of fine particle size, for example, less than about one micron in diameter. Such fine material may be prepared by precipitating $CaHPO_4$, for example, by mixing a soluble calcium salt such as calcium nitrate, $Ca(NO_3)_2$, or calcium chloride, $CaCl_2$, with diammonium phosphate, $(NH_4)_2HPO_4$. Use concentrated solutions of each, a continuous precipitation technique, and rapid mixing, for example, by using a centrifugal pump as a mixing chamber. The resultant precipitate is very fine

$$CaHPO_4 \cdot 2H_2O$$

which is fired (ignited) at a low temperature, for example, 800° C. for two hours, to convert it to pyrophosphate. The low temperature reduces tendency for crystal growth.

Measurements of reflectivity of calcium pyrophosphate prepared from calcium nitrate and diammonium phosphate showed reflectivity superior to MgO at wavelengths from 2000 to 7000 A., it being understood that MgO is considered a standard of reflectivity. When prepared with $CaCl_2$, the reflectivity was almost as good as MgO; it was superior from 3100 to 7000 A. and not as good from 2000 to 3100 A. It may be that the difference between the materials prepared from the chloride and the nitrate was because of a difference in purity rather than the effect of chloride or nitrate.

The addition of the calcium pyrophosphate to the phosphor does not effect normal maintenance characteristics of the lamp. Indeed, it seems to improve the maintenance of efficiency, lumens per watt, when compared to control lamps.

The addition of one-half percent $Ca_2P_2O_7$, based on phosphor weight, reduces flaking considerably and does not affect light output in lumens. For example, using a standard snap technique, the area of flaking is reduced from 40–50 mm. to 10–15 mm. A one percent by weight addition of $Ca_2P_2O_7$ virtually eliminates flaking.

By way of example, a suspension may be prepared consisting of about one liter of water, one thousand grams phosphor, five grams ammonium carboxymethylcellulose (CMC) resin, five milliliters monoethanol amine, twenty-seven p.p.m. by volume (parts per million) Igepal, and five to ten grams $Ca_2P_2O_7$.

The phosphor in the above example may be the widely used halophosphates of algaline earth metal such as calcium and activated with antimony alone or both antimony and manganese. Such phosphors are disclosed, for example, in Patent 2,488,733, McKeag and Ranby. The monoethanol amine is an example of an organic base which is less volatile than ammonium hydroxide and which is preferably added to keep the pH of the suspension up to about eight or nine. The Igepal is preferably added as an example of a wetting agent and is a nonionic surfactant, a polyoxyethylated nonylphenol; a preferred one is known as Igepal CO-530, marketed by General Aniline & Film Corporation.

The ingredients of the suspension are thoroughly mixed together, and it is then flowed over the inner surface of the glass envelope, dried and baked in the usual manner at a temperature of about 500 to 600° C. for a few minutes to drive off the binder. The tubular envelope is then made into a lamp in the usual manner, by sealing alkaline earth oxide activated, filamentary tungsten electrodes into the ends thereof, evacuating and filling the envelope with a starting gas such as argon at a few millimeter's pressure and a small quantity of mercury.

It will be understood that the above example is given by way of illustration only. Aqueous suspensions of phosphor in solutions of CMC resins are also described, for example, in Patent 2,824,814, Jones. Other examples of water soluble binder suspensions are an ammoniacal aqueous solution of the copolymer of methyl vinyl ether and maleic anhydride and the polymer of acrylic acid, as disclosed in Patent 3,006,781, Martyny, and solutions of salts of alginic acid, as disclosed in Patent 2,676,894, Anderson et al.

What we claim as new and desire to secure by Letters Patent of the United States is:

1. A fluorescent coating on a transparent base, said coating comprising powdered phosphor particles mixed with separate finely divided particles of calcium pyrophosphate as an adhesive.

2. A fluorescent coating as in claim 1 wherein the coating contains halophosphate as phosphor.

3. A fluorescent coating as in claim 1 wherein the calcium pyrophosphate is in an amount about one-half to one percent by weight of the phosphor.

4. A fluorescent coating as in claim 1 wherein the particle size of the calcium pyrophosphate is less than about one micron.

5. A fluorescent coating as in claim 1 wherein the calcium pyrophosphate is in an amount about one-half to one percent by weight of the phosphor and has a particle size less than about one micron.

6. The method of coating a fluorescent lamp envelope which comprises coating the envelope with an aqueous suspension containing about one-half to one percent finely divided calcium pyrophosphate by weight of powdered phosphor, said calcium pyrophosphate and phosphor being composed of separate particles, and baking the coated envelope.

7. The method of claim 6 wherein the calcium pyrophosphate has a particle size less than about one micron.

8. The method of claim 6 wherein the phosphor comprises halophosphate.

References Cited by the Examiner

UNITED STATES PATENTS

| 2,366,270 | 1/1940 | Lemmers | 117—33.5 |
| 2,523,005 | 9/1950 | Froelich | 117—33.5 |
| 2,901,400 | 8/1959 | Fritts | 23—108 |
| 2,976,249 | 3/1961 | Rimbach et al. | 117—33.5 |

ALFRED L. LEAVITT, *Primary Examiner.*

A. H. ROSENSTEIN, *Assistant Examiner.*